April 24, 1934.  R. W. ERDLE ET AL  1,956,278
METHOD OF LINING MOLDS
Filed Aug. 20, 1930
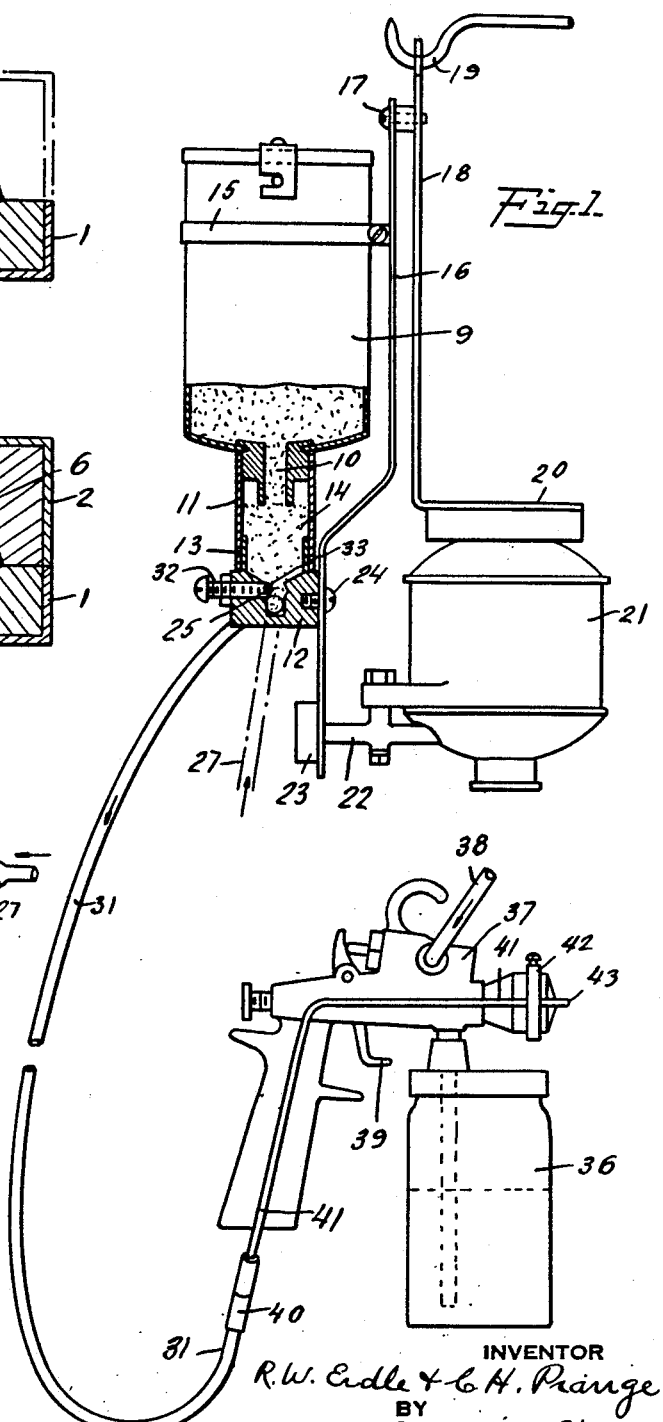
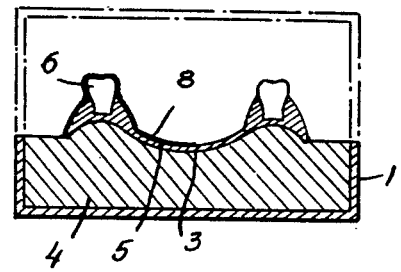
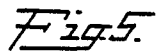
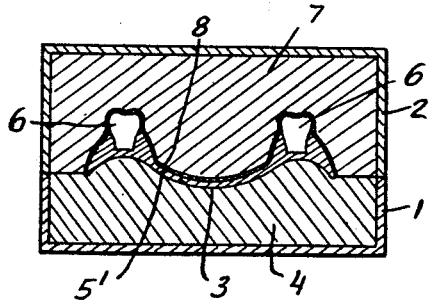
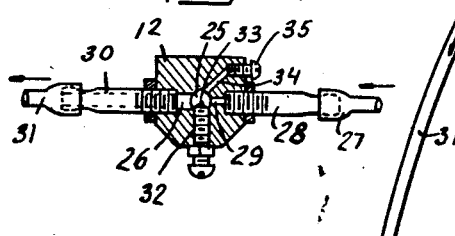
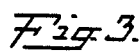
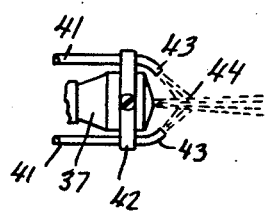
INVENTOR
R. W. Erdle & C. H. Prange
BY
Pennie, Davis, Marvin & Edmonds
ATTORNEYS Patented Apr. 24, 1934

1,956,278

UNITED STATES PATENT OFFICE 1,956,278

METHOD OF LINING MOLDS

Reiner W. Erdle, New York, N. Y., and Charles H. Prange, Lyndhurst, N. J., assignors to Austenal Laboratories, Inc., New York, N. Y., a corporation of New York Application August 20, 1930, Serial No. 476,505

4 Claims. (Cl. 22—189)

This invention relates to the manufacture of dentures and more particularly to an improved method of coating a pattern to provide a smooth, homogeneous surface for vulcanizing rubber dentures or for casting metallic plates.

In the usual method of making dental plates, an impression of the mouth is first taken on a plastic body to form a negative. A positive is then produced from the negative and placed in the lower half of a two part flask. The flask is filled with plaster of Paris or other similar plastic material, and the surface of the positive is then covered with a coating of wax. The teeth are then placed in position and the upper half of the flask or mold filled with plaster of Paris or other suitable plastic. The wax is then removed and vulcanite or other suitable plastic denture composition is placed in the mold and vulcanized to produce the plate. A plate made in this manner is rough which is probably due to the porosity of the plaster of Paris or other material employed in the mold. This necessitates an excessive amount of labor to finish the denture. There is also danger of spoiling the plate in the finishing operation due to the possibility of forming a hole through it where the rubber is thin and there is also danger of exposing the pins of the teeth or cutting through the pink rubber facing and exposing the dark rubber beneath.

The present invention consists in the application of a coating to the waxed denture which is smooth and homogeneous on the surface in contact with the pattern, and rough on its other surface so that it will adhere to plaster of Paris, or similar material. The upper half of the flask is then placed in position in the usual manner and, when the upper half of the flask is removed to build up the rubber denture, this coating adheres to the plaster of Paris of the top half of the mold so that when the mold is reassembled for vulcanizing a smooth surface is provided in contact with the surface of the vulcanite or other denture composition and a product is thus produced having a relatively smooth surface which requires only light brushing with pumice and water and buffing to finish it. This eliminates the work of scraping and chiseling or sand papering the rubber denture to produce the desired surface and gives a substantially perfect reproduction of the carving of the waxed denture. The denture can be made thinner without danger of forming a hole through it during the polishing operation and the amount of pink facing rubber employed can be reduced as the possibility of cutting through it is substantially eliminated.

The coating can be applied to the waxed denture in several different ways but is preferably sprayed on the denture to provide a coating of uniform thickness. The invention further comprises a coating composition and suitable apparatus for applying it to the surface of the denture.

In the accompanying drawing,

Fig. 1 is a side elevation of the apparatus employed in spraying the coating on the denture, parts being shown in section;

Fig. 2 is a detailed view of the outlet end of a container for the powdered ingredients of the coating;

Fig. 3 is a plan view of the end of a spray gun shown in Fig. 1 of the drawing showing a modification in the construction of the spray gun to simultaneously apply a coating of a powder and a liquid;

Fig. 4 is a vertical, sectional view of the lower half of a dental flask or mold showing the waxed denture and teeth in place and showing the coating partially applied; and Fig. 5 is a similar view of the entire dental mold showing the teeth and denture and showing the coating applied over the entire surface of the denture.

Referring to Figs. 4 and 5 of the drawing, the reference numerals 1 and 2 designate generally the upper and lower sections of a dental mold. In forming a dental plate an impression of the mouth is first taken, as stated above, and from this negative a positive is formed which is placed in the lower section of the mold as represented by the surface 3 on the top of a body of plaster of Paris 4. A waxed denture 5 is then formed on the mold and the teeth 6 are placed in position. Ordinarily the upper section of the mold is filled with plaster of Paris as indicated at 7 in Fig. 2 and arranged over the waxed denture. The wax is then replaced by vulcanite which is built up in the mold and then vulcanized to produce a dental plate 5'. Ordinarily the vulcanite is in direct contact with the plaster of Paris. Due possibly to the porosity of the plaster of Paris and possibly to reaction between the denture composition and the plaster of Paris, the plate so produced is provided with a rough surface.

In carrying out our invention we form the positive as shown in Fig. 4 of the drawing and then form a coating over the waxed denture as indicated at 8. This coating can be applied in any suitable manner and may be formed of any suitable materials capable of producing a homogeneous coating having a smooth surface. Preferably, however, the coating is formed by spraying two materials, or two mixtures of materials that will chemically react when brought together on the surface of the waxed denture so that the reaction will take place immediately to form the coating. The materials must also be capable of adhering to the surface of the plaster of Paris 7 in the upper portion of the mold so that when the wax is melted out the coating can be removed with the upper half of the mold and the vulcanite or other denture material built up in the mold. When the upper half of the mold is replaced, the smooth surface of the coating will contact with the denture material and the dental plate 5' produced will thus have a smooth surface requiring very little finishing.

As above stated, the coating may be formed of any suitable material that is capable of forming a homogeneous coating, and that will adhere to the plaster of Paris in the upper section of the mold and not react with the vulcanite or other denture composition at the vulcanizing temperature employed. Preferably the coating contains some powdered metal and we have found that aluminum powder is particularly suitable for this purpose although other powdered metals may be employed in its place. The powdered metal is mixed with other powdered materials, and sprayed on the pattern simultaneously with a liquid capable of reacting with one or more of the powdered ingredients to form a homogeneous coating. The liquid employed may be a solution of sodium silicate, low in alkali. When a sodium silicate solution is used, the powdered mixture must contain an ingredient capable of precipitating silica gel. Boric acid or ammonium chloride may be employed for this purpose. The powdered mixture may also contain some plaster of Paris to facilitate setting of the coating.

The powdered mixture is preferably sprayed on the denture simultaneously with the solution of an alkali metal silicate, such as sodium silicate, low in alkali, which reacts with the ingredients of the powdered mixture to form a suitable salt which will not interfere with the vulcanizing process. The sodium silicate may be formed of a solution of two parts of sodium silicate and one part of water. Undiluted sodium silicate dries rapidly and will cause shrinking of the coating. The addition of water prevents too rapid drying but the addition of too much water produces a weak coating. Other materials may be added to the sodium silicate solution to prevent shrinking without diluting the solution too much. A material that may be employed for this purpose is blood albumin and the blood albumin may be added to the water to the full amount that the water will take up. A trace of thymol or other preservative for the albumin may also be added.

The solution above described may be sprayed on to the denture simultaneously with the powdered mixture referred to above. The proportions of the materials of the powdered mixture may be widely varied but we preferably employ eight parts of aluminum powder, fifteen parts of powdered tin, two parts of powdered quartz, five parts of plaster of Paris and two and one-eighth parts of tungstic oxide, one and one-fourth parts boric acid, and one and one-eighth parts of a rubber accelerator, such as R & H #50. When the article being made is not to be vulcanized, the accelerator is, of course, omitted.

In Figs. 1 to 3 of the drawing we have shown an apparatus which may be advantageously employed in the application of the coating described above, or other coatings consisting of a powdered material and a solution. As shown, we provide a container 9 for the powdered material which is provided with a relatively large orifice 10 at the bottom. A flexible tube 11 of suitable length is arranged over the container outlet and is closed by an outlet plug 12 at the lower end. The outlet plug is provided with a flange 13 fitting within the tube which forms a feeding device and is adapted to always contain a quantity of the material as indicated at 14. To insure feed of the material from the container to the tube 11 the container is preferably vibrated and is provided with a supporting band 15 arranged near the upper end. This supporting band is connected to an oscillating member 16 which is pivotally mounted as at 17 on a bracket or frame 18. As shown the bracket is carried by a hook 19 and the lower end of the bracket forms a support 20 for a vibrator 21. The vibrator is of a standard type and is provided with a pivoted lever 22 operated by means of an eccentric (not shown) on the motor shaft of the vibrator. This pivoted lever is also connected to the supporting member 16 at the end opposite the pivot 17 as indicated at 23 and the member 16 is thus oscillated transversely on the pivot 17. The oscillating member is also connected to the plug 12 as indicated at 24. The top of the plug 12 is provided with an orifice 25 of reduced cross section communicating with a cross passage 26. The provision of a relatively small orifice 25 insures more uniform feed of the powdered material. A pipe or tube 27 is connected to a source of compressed air and is adapted to communicate with a fitting 28 in alignment with the port or passage 26. Between the end of the port 26 and the inner end of the fitting 28 there is an orifice 29 of reduced cross section which serves as a nozzle blowing compressed air into the larger port 26 and drawing the powdered material through the orifice 25. A fitting 30 similar to the fitting 28 is arranged diametrically opposite thereof and is connected to a flexible tube or pipe 31 to convey the powdered material to the spray gun. The feed of powdered material may be controlled by a screw 32 having a conical end 33 which serves as a needle valve. The plug 12 may be provided with another passage 34 communicating with the inner end of port 26 and normally closed by a plug or screw 35.

The liquid is contained in a suitable container 36 having a spray gun 37 arranged thereon. Except for the feed of powdered material, the spray gun is of ordinary construction and a detailed description thereof is deemed unnecessary. The compressed air enters through tube 38 and the feed of compressed air and delivery of the solution is controlled by a trigger 39.

Flexible tube 31 is connected to a T connection 40 at the butt end of the gun communicating with tubes 41 extending up each side and along the barrel of the spray gun. A yoke 42 is secured to the spray gun adjacent the outer end thereof and forms a support for these tubes. The ends of the tubes are extended inwardly as at 43 so that the powdered material conveyed through the tubes and the atomized liquid from the gun are directed into each other as indicated at 44 in Fig. 3 of the drawing and thus sprayed on to the denture as indicated in Figs. 4 and 5 of the drawing. By using suitable materials or mixtures of materials that will readily react with each other to form a dense coating the desired coating may be readily obtained in this manner of substantially uniform thickness and density.

As stated the screw 32 serves as a needle valve to regulate the delivery of powdered material and the proportion of powdered material may be further cut down by removing the screw or plug 35 to permit air to flow into the tube 31 through passage 34 and port 26.

The invention may also be applied to the making of castings of stainless steel or other castings of high fusing metals. The process, when applied to casting metal plates, is substantially the same. The waxed denture or other pattern to be reproduced is first formed and coated with a homogeneous coating in the manner heretofore described and then embedded in a less refractory but quick setting material, such as plaster of Paris. The metal plate or other casting so formed has a smooth, clean surface and is free from contamination by products given off by the plaster of Paris or other quick setting material used in the mold.

A refractory coating is employed in casting metal plates. As an example we may employ calcined bauxite (alumina) 96 parts by weight, and ammonium chloride or other soluble material which will precipitate silica gel, four parts by weight. This mixture is placed in tank 9 and used with the alkali metal silicate solution, such as sodium silicate solution, in the manner described above.

In place of a silicate coating we may employ a lacquer coating formed from cellulose acetate, dissolved in a suitable solvent, such as acetone and a plasticizing agent. The lacquer coating may be used either in the manufacture of vulcanized dentures or in the casting of metal plates. We find glyptal lacquers particularly suitable for this purpose. The boric acid, or other precipitating agent, may then be eliminated from the powdered mixture. The powdered mixture employed in connection with vulcanized dentures may consist of powdered metal, a filler such as powdered quartz, and plaster of Paris, or other quick setting material. In the casting process, a refractory material, such as calcined bauxite is employed.

Likewise synthetic resins in liquid form may be employed in connection with the powdered mixture of metal, quartz and plaster of Paris. A liquid or gaseous catalyzer to produce speedy solidification is preferably used therewith. As an example furfural-phenol and hydrogen chloride may be employed.

While the invention is not limited to a coating applied by spraying particular attention is directed to this method of applying the coating. A homogeneous coating is thus obtained with a smooth surface in contact with the pattern, and a rough surface on the other side which will adhere to the plaster of Paris backing, and insure its removal with the top half of the mold.

We claim:

1. In the manufacture of a cast denture of high fusing metal, the method of lining the mold with highly refractory material, which consists in spraying separately but simultaneously onto a wax pattern a powdered, highly refractory material, a silicate solution, and a material adapted to precipitate silica gel from said silicate solution, said materials reacting instantaneously to form on the pattern a hardened refractory coating which will adhere to and line the mold which is formed around said pattern.

2. In the manufacture of a cast denture of high fusing metal, the method of lining the mold with highly refractory material, which consists in spraying separately but simultaneously onto a wax pattern a quantity of powdered alumina, a silicate solution, and a material adapted to precipitate silica gel from said silicate solution, said materials reacting instantaneously to form on the pattern a hardened refractory coating which will adhere to and line the mold which is formed around said pattern.

3. In the manufacture of a cast denture of high fusing metal, the method of lining the mold with highly refractory material, which consists in spraying separately but simultaneously onto a wax pattern a powdered, highly refractory material, a solution of sodium silicate, and a material adapted to precipitate silica gel from said silicate solution, said materials reacting instantaneously to form on the pattern a hardened refractory coating which will adhere to and line the mold which is formed around said pattern.

4. In the manufacture of a cast denture of high fusing metal, the method of lining the mold with highly refractory material, which consists in spraying separately but simultaneously onto a wax pattern a quantity of powdered alumina, a solution of sodium silicate, and ammonium chloride which is adapted to precipitate silica gel from said silicate solution, said materials reacting instantaneously to form on the pattern a hardened refractory coating which will adhere to and line the mold which is formed around said pattern.

REINER W. ERDLE.
CHARLES H. PRANGE.